United States Patent [19]

Klepeis

[11] 4,450,146

[45] May 22, 1984

[54] HEAT RECOVERY IN $P_2O_5$ PRODUCTION PROCESS

[75] Inventor: John E. Klepeis, New Fairfield, Conn.

[73] Assignee: Stauffer Chemical Company, Westport, Conn.

[21] Appl. No.: 430,088

[22] Filed: Sep. 30, 1982

[51] Int. Cl.³ .................... C01B 15/16; C01B 25/01; C01B 25/02
[52] U.S. Cl. .................................. 423/304; 423/322; 423/323; 122/4 D
[58] Field of Search ....................... 423/304, 322, 323; 122/4 D

[56] References Cited

U.S. PATENT DOCUMENTS 3,077,382 2/1963 Klein et al. .................... 423/304

OTHER PUBLICATIONS

Chemical Week, Jan. 31, 1979, p. 36.

Primary Examiner—Gregory A. Heller
Attorney, Agent, or Firm—Vivienne T. White

[57] ABSTRACT

Waste heat is recovered during the production of phosphorus pentoxide by a process comprising the combustion of phosphorus and the passing of the combustion gases through a fluid bed, wherein the solids making up the fluid bed are utilized to recover heat values derived from the process by contacting the same with water to produce steam.

5 Claims, 1 Drawing Figure

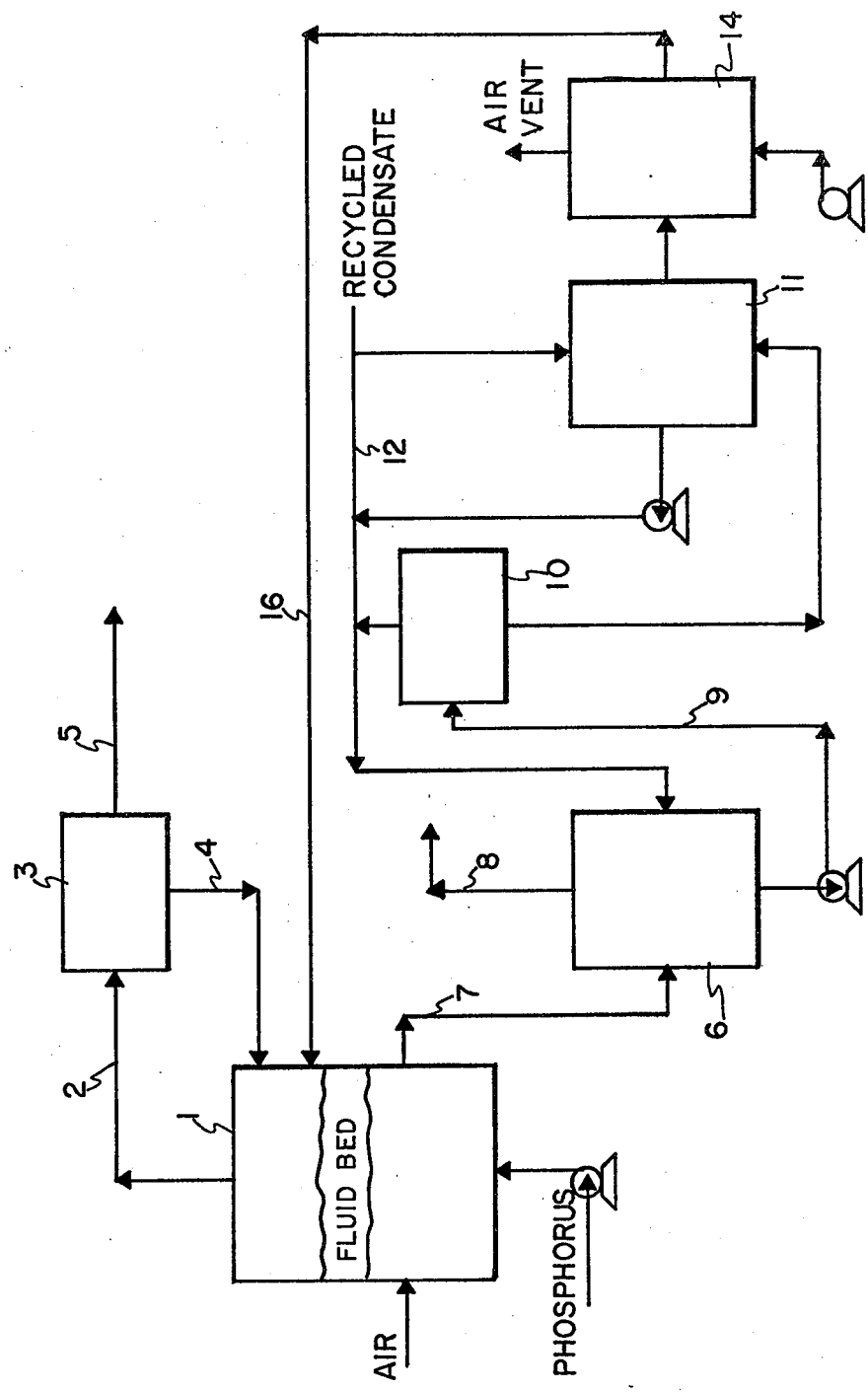

HEAT RECOVERY IN P$_2$O$_5$ PRODUCTION PROCESS

BACKGROUND OF THE INVENTION

1. Field of the Invention

The invention pertains to the manufacture of phosphorus pentoxide in general and in particular to recovering waste heat values during the process while preventing the corrosive effects of meta and polyphosphoric acid impurities formed during the process.

2. Related Art

The high heat of combustion of phosphorus to phosphorus pentoxide and ultimately to produce phosphoric acid equals about 10MBTU/lb. (730 Kcal/mol of P$_4$), and can be utilized in the evaporation of water from dilute phosphate solutions or phosphoric acid solutions that require concentration before subsequent processing.

In the prior art manufacture of phosphorus pentoxide (P$_2$O$_5$) and ultimately phosphoric acid, phosphorus is burned in excess air and the resulting P$_2$O$_5$ is hydrated. Heat transfer surfaces utilized in the prior art as a means of recovering some of the heat of combustion are subject to severe corrosion as a result of the formation and build-up of metaphosphoric and polyphosphoric acids (hereinafter meta and polyacids) during heat recovery.

It has been suggested to recover low level ($<100°$ C.) heat from wet manufacturing processes by operating on the Rankine cycle. This process, however, would only recover the low level heat which amounts to $<5\%$ of the heat value realized.

Derwent Publication, No. 60687B (1979), reported on Japanese Pat. No. 84,890 which is said to disclose a phosphoric acid plant wherein corrosion is prohibited by predrying the combustion air to prevent the formation of corrosive polyphosphoric acids, and heat-transfer surfaces are operated above the dewpoint of P$_2$O$_5$. However, during process upsets and shutdown, the presence of moisture can still cause severe corrosion problems.

An article in *Chemical Week*, Jan. 31, 1979 issue, page 36 disclosed that Battelle Laboratories was utilizing Battelle's multisolid fluidized-bed combustion process to burn solids and sewage sludges. The unit is described as burning waste mixed with sand while the mixture is suspended in a vertical air stream. The hot sand is then separated and recirculated through an external boiler where it is utilized to dry the sludge and vaporize water to produce steam.

It is an an object of the invention to provide a process for the manufacture of phosphorus pentoxide which can be further treated to produce phosphoric acid whereby the waste heat, generated in the manufacture of the P$_2$O$_5$ intermediate, can be recovered.

The invention discloses a process for recovering a major portion of the heat values generated in the manufacture of phosphorus pentoxide at high temperature levels while eliminating corrosion problems associated with prior art processes.

SUMMARY OF THE INVENTION

A process for manufacturing phosphorus pentoxide is disclosed wherein the heat derived from the combustion of the phosphorus is recovered. The process comprises the combustion of phosphorus in an excess of air and conveying the combustion gases through at least one fluidized bed comprised of inert, solid particles, and wherein steam is produced by contacting the heated solid bed particles with water. Meta and phosphoric acid impurities produced during the process are removed and buildup thereof is avoided by purging the acid impurities from the fluid bed particles and the phosphorus pentoxide containing combustion gases are recovered.

BRIEF DESCRIPTION OF THE DRAWINGS

The FIGURE illustrates a flow diagram comprising an embodiment of the process of the invention.

DETAILED DESCRIPTION OF THE INVENTION

Phosphorus pentoxide, in the process of the invention, is produced by the combustion of elemental white (yellow) phosphorus and the conveying of the hot gases (P$_2$O$_5$, polyacid impurities, excess O$_2$ and nitrogen) through at least one fluid bed position either in the combustion unit or in a separate unit. The nitrogen gas is derived from the air used to burn the phosphorus. In the process, the phosphorus is burned in a combustion unit comprising at least one fluid bed or alternatively the phosphorus is burned in one unit and the hot gases are conveyed into a separate unit containing at least one fluid bed, as indicated above. It is, of course, preferable to locate the fluid bed in the same unit in which the phosphorus is burned.

The fluid bed, which can comprise any inert high melting point solids is generally maintained at temperatures of from about 250° C. to about 1250° C. The hot combustion gases (P$_2$O$_5$, polyacid impurities, excess O$_2$ and nitrogen) at from about 1500° C. to about 2200° C. are passed through the bed particles and cooled. The cooled gases are vented from the fluid bed unit at a temperature of from about 250° C. to about 1250° C. and the hot particles are continuously removed and conveyed to a steam generator.

In the disclosed fluid bed process the meta and polyacids, produced during the process, are not vented with the other combustion gases but adhere to the solid bed particles due to their higher boiling points and natural tendency to stick to exposed surfaces.

The meta and polyacids are subsequently washed from the hot solid particles in the steam generator with water and preferably condensate. Condensate is, of course, water which has been changed from the vapor to the liquid form. To maintain these acids at a controllable level, a portion of the water is constantly purged from the system. To avoid corrosion in the steam generator a neutral pH can be maintained by the addition of a base (e.g., caustic) or a buffer (e.g., disodium phosphate) to the condensate. The solid bed particles are thereafter, further treated to remove water, and dried prior to recycling to the fluid bed for subsequent heat pick up.

The process can best be described with reference to the drawing. The FIGURE illustrates an embodiment of the invention wherein phosphorus and air are introduced into a combustion unit 1 containing a fluid bed (as shown) comprised of solid particles such as sand (SiO$_2$), aluminum oxide (Al$_2$O$_3$) or the like. The elemental phosphorus is burned at a temperature of from about 1500° C. to about 2200° C. and the combustion gases which have been cooled by passage through the fluid bed are removed via line 2 to a separator 3 (e.g., cyclone), where the gases are further separated from the finer solid particles which are returned to the fluid bed via line 4. The combustion gases which are comprised mainly of $P_2O_5$ and nitrogen are then conveyed from the separator via line 5 for further processing such as to produce phosphoric acid by traditional methods of water absorption of the $P_2O_5$.

The fluid bed particles, which in the instant embodiment are preferably sand, are continuously conveyed to a steam generator 6 via line 7 where the hot particles produce steam, by the direct contact of the sand with water. Steam is then conveyed from the steam generator via line 8 for plant use. The process thereby recovers the major portion of the heat from the combustion process which would otherwise be lost, and produces steam which can be utilized, for example, to evaporate water from dilute phosphate solutions that require concentration prior to processing or for other plant use.

The sand or bed particles, water and steam (still entrained with the sand) are then introduced via line 9 to dewatering facilities 10 and 11 which can comprise any known means such as for instance a hydrocyclone and a continuous dewatering centrifuge respectively.

The purge of meta and polyacid impurities from the steam can be taken at any point in the steam generation system. Water which remains as condensate with the sand particles in the steam generator is continuously recycled between the generator, hydrocyclone and centrifuge. This water or condensate from the steam generator can be segregated in the centrifuge from clean condensate (obtained generally from the plant use of the steam from the generator) via line 12. Condensate recovered from plant use is recycled back to the steam generator and the dewatering centrifuge via line 12. The fluid bed particles after dewatering are further dried in an air drying unit 14 and recycled via line 16 to the fluid bed combustor for further heat recovery. Any amount of heat can be recovered depending on the contact time and recovery efficiency.

It is within the scope of the invention to utilize a plurality of fluid beds to recover heat at different temperature levels. For instance, in the embodiment shown, heat leaving the fluid bed at a temperature of from 1250° C. is passed through a second bed which recovers heat from the combustion gasses at a temperature somewhat below that of the first fluid bed. It should be obvious to one of skill in the art that the heat recovered must be above the temperature at which phosphorous pentoxide condenses.

It is expected that a minimum of about 55% of the waste heat can be recovered in the manner disclosed.

It should be obvious to one having ordinary skill in the art that other methods of practicing the invention are within their knowledge without departing from the spirit of the invention.

What is claimed is:

1. A process for the manufacture of phosphorus pentoxide wherein heat valuse are recovered comprising the steps of:
    (a) burning elemental phosphorus in the air to produce $P_2O_5$ containing combustion gases
    (b) allowing the hot combustion gases to pass through at least one fluidized bed containing inert, high melting point solid particles whereby the solid particles are heated
    (c) recovering the $P_2O_5$ containing combustion gases, and
    (d) contacting the heated bed particles with water to produce steam and thereby recover heat values.

2. The process of claim 1 wherein the elemental phosphorus is combusted at a temperature of from about 1500° C. to about 2200° C.

3. The process of claim 1 wherein the solid bed particles are comprised of sand.

4. The process of claim 1 wherein the fluid bed is heated to a temperature of from about 250° C. to about 1250° C. by the passage of the combustion gases through the bed.

5. A process for the manufacture of phosphorus pentoxide wherein heat values are recovered comprising the steps of:
    (a) burning elemental phosphorus in the air to produce $P_2O_5$ containing combustion gases
    (b) allowing the hot combustion gases to pass through a plurality of fluidized beds each containing inert, high melting point solid particles whereby the solid particles are heated
    (c) recovering the $P_2O_5$ containing combustion gases, and
    (d) contacting the heated bed particles with water to produce steam and thereby recover heat values.

* * * * *

UNITED STATES PATENT AND TRADEMARK OFFICE
CERTIFICATE OF CORRECTION

PATENT NO. : 4,450,146
DATED : May 22, 1984
INVENTOR(S) : John E. Klepeis

It is certified that error appears in the above—identified patent and that said Letters Patent is hereby corrected as shown below:

Col. 4, line 11, "valuse" should be -- values --.

Signed and Sealed this

Sixteenth Day of October 1984

[SEAL]

Attest:

GERALD J. MOSSINGHOFF

Attesting Officer

Commissioner of Patents and Trademarks